US012566268B2

(12) United States Patent
Huang et al.

(10) Patent No.: US 12,566,268 B2
(45) Date of Patent: Mar. 3, 2026

(54) THREE-LASER PHASE DISTANCE MEASURER

(71) Applicant: SNDWAY TECHNOLOGY (GUANGDONG) CO., LTD., Dongguan (CN)

(72) Inventors: Zan Huang, Dongguan (CN); Gang He, Dongguan (CN)

(73) Assignee: SNDWAY TECHNOLOGY (GUANGDONG) CO., LTD., Dongguan (CN)

( * ) Notice: Subject to any disclaimer, the term of this patent is extended or adjusted under 35 U.S.C. 154(b) by 218 days.

(21) Appl. No.: 18/638,686

(22) Filed: Apr. 18, 2024

(65) Prior Publication Data

US 2024/0393462 A1 Nov. 28, 2024

(30) Foreign Application Priority Data

May 26, 2023 (CN) .......................... 202321308174.5

(51) Int. Cl.
G01S 17/32 (2020.01)
G01S 7/481 (2006.01)
(52) U.S. Cl.
CPC ............ G01S 17/32 (2013.01); G01S 7/4814 (2013.01)

(58) Field of Classification Search
CPC ........ G01S 17/32; G01S 7/4814; G01S 7/481; G01S 7/4815; G01S 17/34; G01S 17/36; G01S 17/08
See application file for complete search history.

(56) References Cited

U.S. PATENT DOCUMENTS

2020/0209523 A1* 7/2020 Nehashi ............... G01B 11/026
2024/0175998 A1* 5/2024 Huang ................... G01S 7/493

* cited by examiner

*Primary Examiner* — Seung C Sohn

(57) ABSTRACT

A three-laser phase distance measurer is provided. The three-laser phase distance measurer includes a main control device, a laser emitting device, and a laser receiving-processing device. The laser emitting device includes an outer light path focusing device, a visible light path focusing-emitting device, and a first optical filter device. The outer light path focusing device and the visible light path focusing-emitting device are electrically connected to the main control device. The outer light path focusing-emitting device and the visible light path focusing-emitting device are adjacent to each other and arranged side by side. The outer light path focusing-emitting device and the visible light path focusing-emitting device are arranged along a same direction. The laser receiving-processing device includes a second optical filter device, a receiver, an inner light path focusing-emitting device, and a bracket device.

20 Claims, 3 Drawing Sheets

THREE-LASER PHASE DISTANCE MEASURER

TECHNICAL FIELD

The present disclosure relates to the technical field of laser distance measuring, and particularly to a three-laser phase distance measurer.

BACKGROUND

Laser distance measurers are widely used in fields such as architecture and interior decoration due to their high measurement accuracy.

Considering that it is difficult for naked eyes of a user to clearly see whether a laser irradiates a measured target under a strong light environment, existing laser distance measurers provide a visible light path focusing-emitting device capable of transmitting a visible light for the user to aim at the measured target. For example, when a laser distance measurer includes a bracket device, a visible light path focusing-emitting device and an external light path focusing-emitting device for emitting an invisible distance measuring laser may be provided at two sides of the bracket device.

However, when a size of the measured target is small, due to the bracket device being a device with a certain size, there is a certain distance between the visible light and the invisible distance measuring laser emitted by the laser distance measurer. As a result, the visible light and the invisible distance measuring laser cannot irradiate on the same measured target, thereby leading to inaccurate measurement.

SUMMARY

In view of the above shortcomings in the related art, the present disclosure provides a three-laser phase distance measurer, which solves the technical problem of inaccurate measurement caused by the inability of the visible light and the invisible distance measuring laser to irradiate the same measured target in the related art.

To achieve the above purpose, the present disclosure provides main technical solutions as follows.

The present disclosure provides a three-laser phase distance measurer. The three-laser phase distance measurer includes a distance measuring body. The distance measuring body includes a main control device, a laser emitting device, and a laser receiving-processing device; the main control device is disposed at a first side of the distance measuring body; the laser emitting device and the laser receiving-processing device are disposed at a second side of the distance measuring body; the laser emitting device is disposed on a third side of the laser receiving-processing device; the first side and the second side are opposite two sides; and the third side is perpendicular to the first side;

the laser emitting device includes an outer light path focusing-emitting device, a visible light path focusing-emitting device, and a first optical filter device; the outer light path focusing-emitting device and the visible light path focusing-emitting device are each electrically connected to the main control device; and the outer light path focusing-emitting device and the visible light path focusing-emitting device are adjacent to each other and arranged side by side; the outer light path focusing-emitting device and the visible light path focusing-emitting device are arranged along an X-axis direction or a Y-axis direction; and the first optical filter device is disposed on a second side of the outer light path focusing-emitting device and the visible light path focusing-emitting device; and the laser receiving-processing device includes a second optical filter device, a receiver, an inner light path focusing-emitting device, and a bracket device; the bracket device provides an accommodating area; the second optical filter device and the inner light path focusing-emitting device are disposed in the accommodating area; the second optical filter device is disposed at a fourth side of the inner light path focusing-emitting device; the receiver is disposed at a first side of the bracket device; the receiver is electrically connected to the main control device; and the fourth side is perpendicular to each of the first side and the third side.

In an embodiment, the laser receiving-processing device further includes an inner light path adjustment device; the inner light path adjustment device is disposed at a fifth side of the main control device; the inner light path adjustment device is electrically connected to the main control device and the inner light path focusing-emitting device; and the fifth side and the fourth side are opposite to each other.

In an embodiment, the distance measuring body further includes a display device; the display device is disposed at the fifth side of the main control device; and the inner light path adjustment device is disposed between the main control device and the display device.

In an embodiment, the laser receiving-processing device further includes a receiving-focusing lens, and the receiving-focusing lens is disposed at an end of the bracket device facing away from the receiver.

In an embodiment, the second optical filter device includes a receiving light path optical filter and a sub-bracket device configured to fix the receiving light path optical filter.

In an embodiment, the receiving light path optical filter and the receiver are arranged in parallel.

In an embodiment, a wavelength of an invisible light emitted by the outer light path focusing-emitting device is the same as a wavelength of an invisible light emitted by the inner light path focusing-emitting device.

In an embodiment, a wavelength of a visible light emitted by the visible light path focusing-emitting device is in a range of 440 nanometers (nm) to 580 nm; and the wavelength of the invisible light emitted by the outer light path focusing-emitting device is greater than 760 nm.

The beneficial effects of the three-laser phase distance measurer are as follows.

By arranging the outer light path focusing-emitting device and the visible light path focusing-emitting device adjacent to each other and side by side along a horizontal direction or a vertical direction (also referred to as an X-axis direction and a Y-axis direction), the visible light and the invisible light can irradiate on the same measured target with a small size, thereby solving the problem of inaccurate measurement in the related art.

In order to make the above purpose, features, and advantages to be achieved by embodiments of the present disclosure obvious and easy to understand, the following provides a detailed description of exemplary embodiments in conjunction with the attached drawings.

BRIEF DESCRIPTION OF DRAWINGS

In order to more clearly illustrate the technical solutions of the embodiments of the present disclosure, the drawings required in the embodiments of the present application will be briefly introduced below. It should be understood that the following drawings only show some embodiments of the present disclosure, and therefore should not be regarded as a limitation of a scope of the present disclosure. For those of ordinary skill in the art, other drawings may also be derived from these drawings.

DESCRIPTION OF REFERENCE NUMERALS

Figure 1:
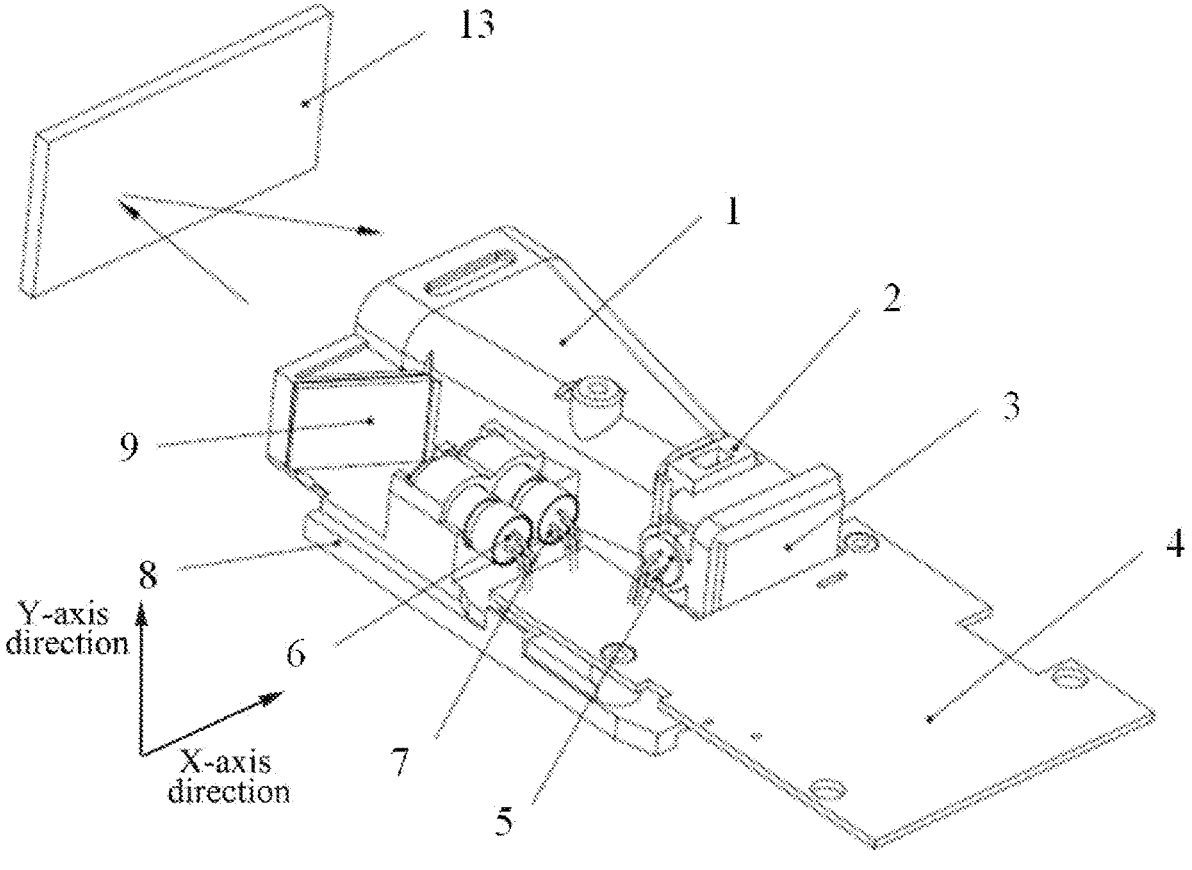
FIG. 1 illustrates a schematic diagram of a distance measuring body in an embodiment of the present disclosure.

1—bracket device; 2—sub-bracket device; 3—receiver; 4—main control device; 5—inner light path focusing-emitting device; 6—visible light path focusing-emitting device; 7—outer light path focusing-emitting device; 8—display device; 9—first optical filter device; 10—receiving-focusing lens; 11—receiving light path optical filter; 12—inner light path adjustment device; 13—measured target.

DETAILED DESCRIPTION OF EMBODIMENTS

In order to facilitate understanding the present disclosure, the present disclosure will be described in detail based on specific embodiments and the attached drawings.

In order to solve the problem of inaccurate measurement in the related art, a three-laser phase distance measurer is provided by the present disclosure. By arranging an outer light path focusing-emitting device 7 and a visible light path focusing-emitting device 6 adjacent to each other and side by side along a same direction, the visible light and the invisible light can irradiate on the same measured target with a small size, which solves the problem of inaccurate measurement in the related art.

In order to better understand the above technical solutions, exemplary embodiments of the present disclosure will be described in detail below with reference to the attached drawings. While exemplary embodiments of the present disclosure are shown in the drawings, it should be understood that the present disclosure may be implemented in various forms and should not be limited by the embodiments set forth herein. On the contrary, these embodiments are provided to understand the present disclosure clearly and to fully convey a scope of the present disclosure to those skilled in the art.

It should be noted that all devices in the embodiments of the present disclosure are physical devices, and connection methods among the devices are also physical connections.

Figure 2:
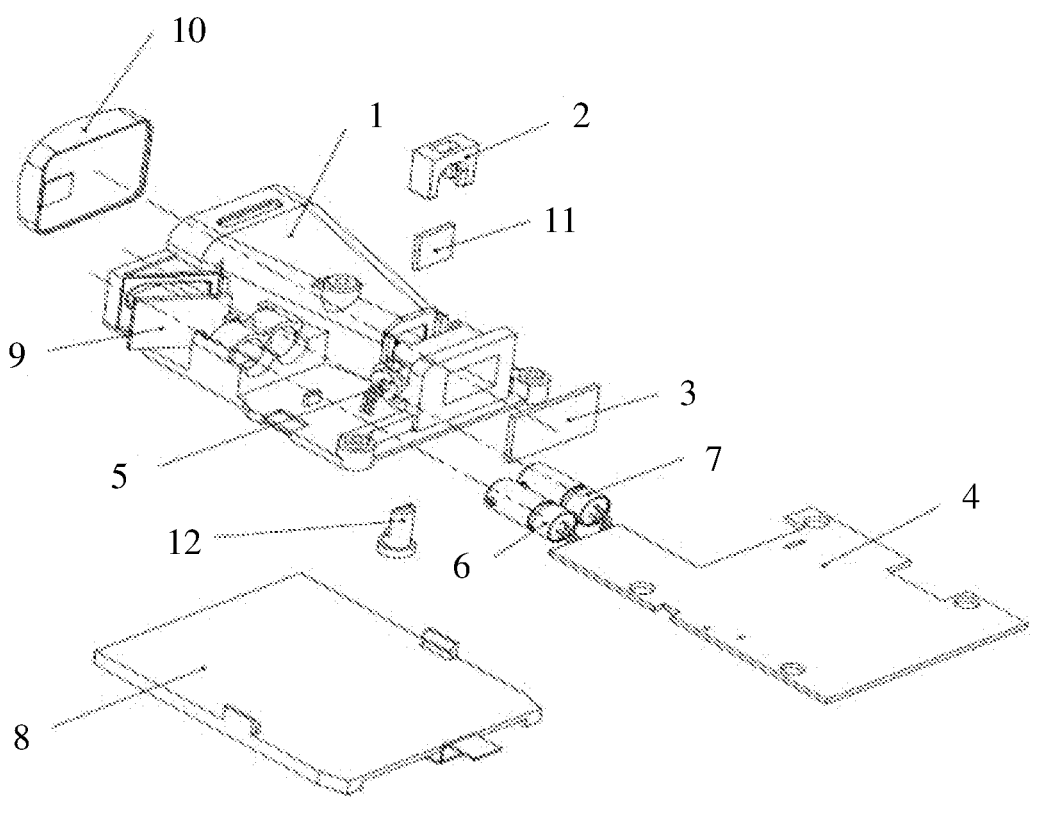
FIG. 2 illustrates an exploded diagram of the distance measuring body in the embodiment of the present disclosure.

Referring to FIG. 1 and FIG. 2, the three-laser phase distance measurer includes a distance measuring body. The distance measuring body includes a main control device 4, a laser emitting device, and a laser receiving-processing device. The main control device 4 is disposed at a first side (for example, as shown in FIG. 1, the first side is a back side when the measured target is determined to be located at a front side) of the distance measuring body. The laser emitting device and the laser receiving-processing device are disposed at a second side (for example, a front side) of the distance measuring body. The laser emitting device is disposed on a third side (for example, a left side) of the laser receiving-processing device. The first side and the second side are opposite two sides. The third side is perpendicular to the first side.

The laser emitting device includes an outer light path focusing-emitting device 7, a visible light path focusing-emitting device 6, and a first optical filter device 9. Both the outer light path focusing-emitting device 7 and the visible light path focusing-emitting device 6 are electrically connected to the main control device 4. The outer light path focusing-emitting device 7 and the visible light path focusing-emitting device 6 are adjacent to each other and arranged side by side. The outer light path focusing-emitting device 7 and the visible light path focusing-emitting device 6 are arranged along an X-axis direction or a Y-axis direction. The first optical filter device 9 is disposed on a second side of the outer light path focusing-emitting device 7 and the visible light path focusing-emitting device 6.

The laser receiving-processing device includes a second optical filter device, a receiver 3, an inner light path focusing-emitting device 5, and a bracket device 1. The bracket device 1 provides an accommodating area. The second optical filter device and the inner light path focusing-emitting device 5 are disposed in the accommodating area. The second optical filter device is disposed at a fourth side (for example, an upper side) of the inner light path focusing-emitting device 5. The receiver 3 is disposed at a first side of the bracket device 1. The receiver 3 is electrically connected to the main control device 4. The fourth side is perpendicular to each of the first side and the third side. The second optical filter device includes a receiving light path optical filter 11 and a sub-bracket device 2 configured to fix the receiving light path optical filter 11. The receiving light path optical filter 11 and the receiver 3 are arranged in parallel.

In addition, referring to FIG. 2, the laser receiving-processing device further includes an inner light path adjustment device 12. The inner light path adjustment device 12 is disposed at a fifth side (for example, a lower side) of the main control device 4. The inner light path adjustment device 12 is electrically connected to the main control device 4 and the inner light path focusing-emitting device 5. The fifth side and the fourth side are opposite to each other.

Figure 3:
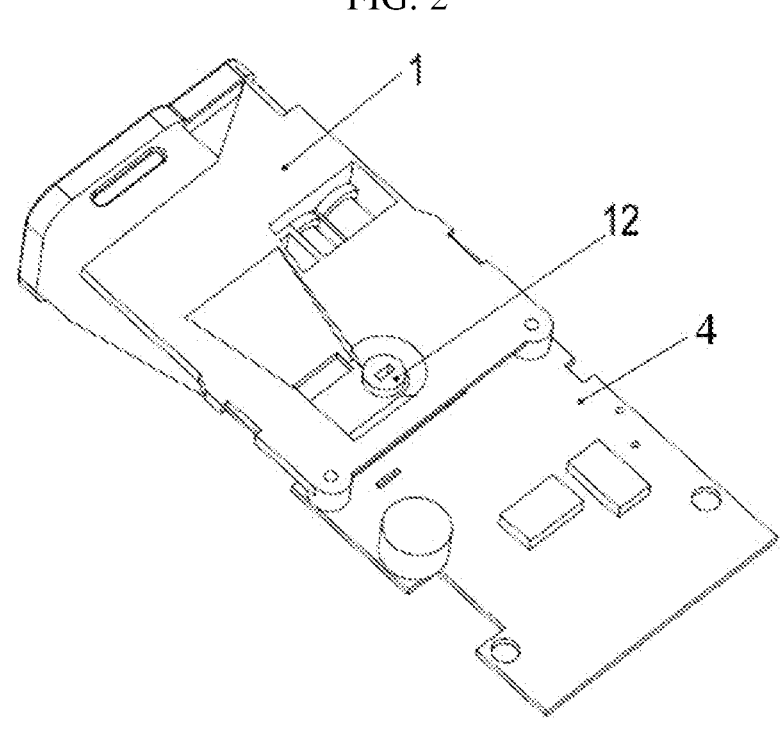
FIG. 3 illustrates a bottom of the distance measuring body in the embodiment of the present disclosure.

Furthermore, referring to FIG. 2 and FIG. 3, the distance measuring body further includes a display device 8. The display device 8 is disposed at the fifth side of the main control device 4. The inner light path adjustment device 12 is disposed between the main control device 4 and the display device 8.

Moreover, referring to FIG. 2, the laser receiving-processing device further includes a receiving-focusing lens 10, and the receiving-focusing lens 10 is disposed at an end of the bracket device 1 facing away from the receiver 3.

It should be understood that each device in the three-laser phase distance measurer can be existing devices, a wavelength of an optical signal emitted by the three-laser phase distance measurer can be set according to actual needs, and the embodiments of the present disclosure are not limited to this.

In an embodiment, the receiver 3 can be an avalanche photodiode (APD) board.

In an embodiment, the display device 8 can be a liquid crystal display (LCD) screen.

In an embodiment, the inner light path adjustment device 12 can be an inner light path control valve.

In an embodiment, when a wavelength of an invisible light emitted by the outer light path focusing-emitting device 7 is the same as a wavelength of an invisible light emitted by the inner light path focusing-emitting device 5. Both the wavelength of the invisible light emitted by the outer light path focusing-emitting device 7 and the wavelength of the invisible light emitted by the inner light path focusing-emitting device 5 are greater than 760 nanometers (nm).

In an embodiment, a wavelength of a visible light emitted by the visible light path focusing-emitting device 6 is in a range of 440 nm to 580 nm.

On the basis of the above settings, the main control device 4 can generate an outer light path high-frequency distance measuring signal (i.e., the invisible light), the distance measuring signal is emitted through the outer light path focusing-emitting device 7 and the first optical filter device 9. At the same time, a visible light emitted by the visible light path focusing-emitting device 6 with a wavelength range of 440 nm to 580 nm is also emitted through the first optical filter device 9. At this time, the visible light can clearly aim at the measured target 13. Moreover, the visible light emitted by the visible light path focusing-emitting device 6 and the invisible light emitted by the outer light path focusing-emitting device 7 are set on a same axis after being calibrated by an optical instrument. The distance measuring device achieves the combination of the visible light and the invisible light through the assistance of the optical instrument, thereby solving the problem of inaccurate measurement caused by the small size of a measured target.

Furthermore, after the visible light with the wavelength range of 440 nm to 580 nm and the invisible light with the wavelength greater than 760 nm are irradiated on the measured target 13, the visible light and the invisible light are reflected by the measured target 13 and then reflected onto the receiving-focusing lens 10 for focusing. Lights with wavelengths other than the measured signal (i.e., the invisible light) are filtered out by the receiving light path optical filter 11, which allows only the visible light greater than 760 nm to pass through the receiving light path optical filter 11 and then mixed by the receiver 3. At the same time, the main control device 4 alternately generates an inner light path high-frequency distance measuring signal having the same frequency and phase as the invisible light signal emitted by the outer light path focusing-emitting device 7. The inner light path high-frequency distance measuring signal passes through the inner light path focusing-emitting device 5 and the inner light path adjustment device 12, and the inner light path high-frequency distance measuring signal directly irradiates onto the receiver 3 for mixing, so that a phase difference between the outer light path high-frequency distance measuring signal and the inner light path high-frequency distance measuring signal is an actual distance phase signal.

It should be noted that methods or programs involved in the laser distance measuring process can also be existing methods or programs.

It should also be noted that the three-laser phase distance measurer can also have a corresponding housing, so that the housing can be used to protect the distance measuring body.

Therefore, in the embodiments of the present disclosure, the visible light path focusing-emitting device 6 is provided in the three-laser phase distance measurer, and the visible light path focusing-emitting device 6 can emit a visible light signal visible to naked eyes. Even in strong light environments, the naked eyes of users can accurately see whether the visible light is irradiated on the measured target 13. By arranging the outer light path focusing-emitting device 7 and the visible light path focusing-emitting device 6 adjacent to each other and side by side along a same direction. For the measured target with a small size, the visible light and the invisible light can irradiate on the same measured target, which solves the problem of inaccurate measurement in the related art.

It should be understood that the above three-laser phase distance measurer are only exemplary, and those skilled in the art can perform various deformations according to the above methods. Technical solutions obtained based on the deformation also fall within the scope of the present disclosure.

Figure 4:
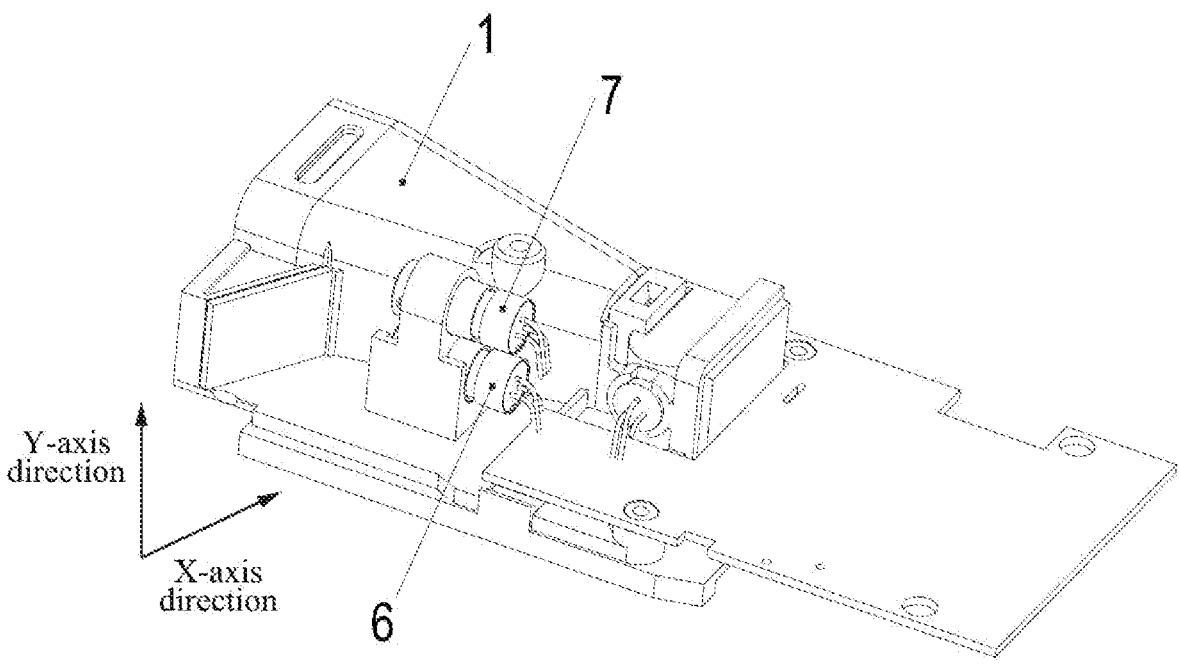
FIG. 4 illustrates another exploded diagram of the distance measuring body in the embodiment of the present disclosure.

Although the outer light path focusing-emitting device 7 and the visible light path focusing-emitting device 6 in FIG. 1 and FIG. 2 are arranged side by side along a horizontal direction (i.e., an X-axis direction). In an embodiment, as shown in FIG. 4, the outer light path focusing-emitting device 7 and the visible light path focusing-emitting device 6 can be arranged side by side in a vertical direction (i.e., a Y-axis direction).

Those skilled in the art should understand that embodiments of the present disclosure can be provided as methods, systems, or computer program products. Therefore, the of the present disclosure can be performed by embodiments using hardware, embodiments using software, or embodiments using a combination of software and hardware. Moreover, the present disclosure may take a form of a computer program product implemented on one or more computer available storage media (including but not limited to disk storage, CD-ROM, optical storage, etc.) containing computer available program codes.

The present disclosure is described with reference to flowcharts and/or block diagrams of methods, apparatus (systems) and computer program products according to embodiments of the present disclosure. It should be understood that each flow and/or block of the flowcharts and/or block diagrams, and combinations of flows and/or blocks in the flowcharts and or block diagrams, can be implemented by computer program instructions.

It should be noted that in the claims, any reference signs placed between parentheses shall not be construed as limiting the claims. The term "comprise" does not exclude the presence of components or steps not listed in a claim. The term "a" or "an" preceding a component does not exclude the presence of multiple components. The present disclosure can be implemented by means of hardware including different components and by means of a programmed computer. In the claims describing multiple devices, multiple devices may be embodied by the same hardware. The terms "first", "second", "third", and the like are used merely for convenience of expression and do not indicate any order. These terms are understood to be a part of name of the component.

Furthermore, it should be noted that in the description of this specification, the terms "an embodiment", "some embodiments", "embodiments", "examples", "specific samples", "some examples", or the like refer to the specific features, structures, materials, or features described in conjunction with the embodiments or examples included in at least one embodiment or example of the present disclosure. In the specification, the illustrative expressions of the above terms do not necessarily refer to the same embodiments or examples. Moreover, the specific features, structures, materials, or features described can be combined in an appropriate manner in any one or more embodiments or examples. In addition, when the features of different embodiments or examples are not contradictory to each other, those skilled in the art may combine different embodiments or examples described in the specification.

Although exemplary embodiments of the present disclosure have been described, those skilled in the art may make additional changes and modifications to these embodiments after learning basic creative concepts of the present disclosure. Therefore, the claims should be interpreted as including exemplary embodiments, and all changes and modifications to these embodiments should fall within the scope of the present disclosure.

Apparently, those skilled in the art can make various modifications and variations to the present disclosure without departing from the spirit and the scope of the present disclosure. In this way, when these modifications and variations of the present disclosure fall within the scope of the claims and equivalent technologies of the present disclosure, the present disclosure should also include these modifications and variations.

What is claimed is:

1. A three-laser phase distance measurer, comprising: a distance measuring body; wherein the distance measuring body comprises: a main control device, a laser emitting device, and a laser receiving-processing device; the main control device is disposed at a first side of the distance measuring body; the laser emitting device and the laser receiving-processing device are disposed at a second side of the distance measuring body; the laser emitting device is disposed on a third side of the laser receiving-processing device; the first side and the second side are opposite two sides; and the third side is perpendicular to the first side;

wherein the laser emitting device comprises: an outer light path focusing-emitting device, a visible light path focusing-emitting device, and a first optical filter device; the outer light path focusing-emitting device and the visible light path focusing-emitting device are each electrically connected to the main control device; the outer light path focusing-emitting device and the visible light path focusing-emitting device are adjacent to each other and arranged side by side; the outer light path focusing-emitting device and the visible light path focusing-emitting device are arranged along an X-axis direction or a Y-axis direction; and the first optical filter device is disposed on a second side of the outer light path focusing-emitting device and the visible light path focusing-emitting device; and wherein the laser receiving-processing device comprises: a second optical filter device, a receiver, an inner light path focusing-emitting device, and a bracket device; the bracket device provides an accommodating area; the second optical filter device and the inner light path focusing-emitting device are disposed in the accommodating area; the second optical filter device is disposed at a fourth side of the inner light path focusing-emitting device; the receiver is disposed at a first side of the bracket device; the receiver is electrically connected to the main control device; and the fourth side is perpendicular to each of the first side and the third side.

2. The three-laser phase distance measurer as claimed in claim 1, wherein the laser receiving-processing device further comprises an inner light path adjustment device; the inner light path adjustment device is disposed at a fifth side of the main control device; the inner light path adjustment device is electrically connected to the main control device and the inner light path focusing-emitting device; and the fifth side and the fourth side are opposite to each other.

3. The three-laser phase distance measurer as claimed in claim 2, wherein the distance measuring body further comprises a display device; the display device is disposed at the fifth side of the main control device; and the inner light path adjustment device is disposed between the main control device and the display device.

4. The three-laser phase distance measurer as claimed in claim 2, wherein the laser receiving-processing device further comprises a receiving-focusing lens, and the receiving-focusing lens is disposed at an end of the bracket device facing away from the receiver.

5. The three-laser phase distance measurer as claimed in claim 1, wherein the second optical filter device comprises a receiving light path optical filter and a sub-bracket device configured to fix the receiving light path optical filter.

6. The three-laser phase distance measurer as claimed in claim 5, wherein the receiving light path optical filter and the receiver are arranged in parallel.

7. The three-laser phase distance measurer as claimed in claim 1, wherein a wavelength of an invisible light emitted by the outer light path focusing-emitting device is the same as a wavelength of an invisible light emitted by the inner light path focusing-emitting device.

8. The three-laser phase distance measurer as claimed in claim 7, wherein a wavelength of a visible light emitted by the visible light path focusing-emitting device is in a range of 440 nanometers (nm) to 580 nm; and the wavelength of the invisible light emitted by the outer light path focusing-emitting device is greater than 760 nm.

9. A three-laser phase distance measurer, comprising:

a laser emitting device, a laser receiving-processing device, and a main control device, disposed at a first side of the laser emitting device and a first side of the laser receiving-processing device;

wherein the laser emitting device comprises: a visible light path focusing-emitting device, an outer light path focusing-emitting device, and a first optical filter device; the visible light path focusing-emitting device and the outer light path focusing-emitting device are adjacent to each other and arranged side by side; the first optical filter device is disposed at a second side of the visible light path focusing-emitting device and a second side of the outer light path focusing-emitting device; the main control device is electrically connected to the outer light path focusing-emitting device and the visible light path focusing-emitting device; and the first side is opposite to the second side; and wherein the laser receiving-processing device comprises: a second optical filter device, a bracket device, a receiver, and an inner light path focusing-emitting device; the bracket device is disposed at a side of the receiver facing away from the main control device; the second optical filter device and the inner light path focusing-emitting device are disposed in the bracket device; and the main control device is electrically connected to the inner light path focusing-emitting device and the receiver.

10. The three-laser phase distance measurer as claimed in claim 9, wherein the visible light path focusing-emitting device is configured to emit a visible light for aiming at a measured target; the outer light path focusing-emitting device is configured to emit an invisible light for measuring a distance from the measured target; and the inner light path focusing-emitting device is configured to emit an invisible light for mixing with the invisible light emitted by the outer light path focusing-emitting device.

11. The three-laser phase distance measurer as claimed in claim 9, wherein the outer light path focusing-emitting device is disposed between the visible light path focusing-emitting device and the bracket device.

12. The three-laser phase distance measurer as claimed in claim 10, wherein a wavelength of the invisible light emitted by the outer light path focusing-emitting device is the same as a wavelength of the invisible light emitted by the inner light path focusing-emitting device.

13. The three-laser phase distance measurer as claimed in claim 12, wherein a wavelength of the visible light emitted by the visible light path focusing-emitting device is in a range of 440 nm to 580 nm; and the wavelength of the invisible light emitted by the outer light path focusing-emitting device is greater than 760 nm.

14. The three-laser phase distance measurer as claimed in claim 9, further comprising: a display device; wherein the laser emitting device, the laser receiving-processing device, and the main control device are disposed on the display device.

15. The three-laser phase distance measurer as claimed in claim 9, wherein the second optical filter device comprises a receiving light path optical filter and a sub-bracket device configured to fix the receiving light path optical filter.

16. The three-laser phase distance measurer as claimed in claim 9, wherein the laser receiving-processing device further comprises a receiving-focusing lens, and the receiving-focusing lens is disposed at an end of the bracket device facing away from the receiver.

17. The three-laser phase distance measurer as claimed in claim 9, wherein the laser receiving-processing device further comprises an inner light path adjustment device, and the inner light path adjustment device is disposed between the main control device and the display device.

18. A three-laser phase distance measurer, comprising:
a bracket device;
a receiving light path optical filter and a sub-bracket device, disposed in the bracket device;
an inner light path focusing-emitting device, disposed in the bracket device and disposed at a side of the second optical filter;
a receiver, disposed at an end of the bracket device;

a main control device, disposed at a side of the receiver facing away from the bracket device and electrically connected to the receiver;
an optical filter device, disposed at a side of the bracket device;
an outer light path focusing-emitting device, disposed at the side of the bracket device;
a visible light path focusing-emitting device, disposed at a side of the outer light path focusing-emitting device facing away from the bracket device,
a receiving-focusing lens, disposed at the other end of the bracket device facing away from the main control device,
a display device, disposed under the bracket device;
wherein the outer light path focusing-emitting device is configured to emit an invisible light for measuring a distance from a measured target; the visible light path focusing-emitting device is configured to emit a visible light for aiming at the measured target; the inner light path focusing-emitting device is configured to emit an invisible light for mixing with the invisible light emitted by the outer light path focusing-emitting device; the receiver is configured to mix the invisible light emitted by the outer light path focusing-emitting device and the invisible light emitted by the inner light path focusing-emitting device, thereby obtain a phase difference between the invisible light emitted by the outer light path focusing-emitting device and the invisible light emitted by the inner light path focusing-emitting device.

19. The three-laser phase distance measurer as claimed in claim 18, further comprising: an inner light path adjustment device disposed between the display device and the main control device;
wherein the inner light path adjustment device is electrically connected to the main control device and the inner light path focusing-emitting device.

20. The three-laser phase distance measurer as claimed in claim 19, wherein a wavelength of the visible light emitted by the visible light path focusing-emitting device is in a range of 440 nm to 580 nm; and a wavelength of the invisible light emitted by the outer light path focusing-emitting device is greater than 760 nm.

* * * * *